(12) United States Patent
Leow et al.

(10) Patent No.: US 10,447,350 B2
(45) Date of Patent: Oct. 15, 2019

(54) HIGH-SPEED CIRCUITS FOR ACTIVE LOAD MODULATION AND RELATED METHODS

(71) Applicant: MEDIATEK Singapore Pte. Ltd., Singapore (SG)

(72) Inventors: Chin-Heng Leow, Singapore (SG); Tieng Ying Choke, Singapore (SG)

(73) Assignee: MEDIATEK Singapore Pte. Ltd., Singapore (SG)

( * ) Notice: Subject to any disclaimer, the term of this patent is extended or adjusted under 35 U.S.C. 154(b) by 0 days.

(21) Appl. No.: 15/867,650

(22) Filed: Jan. 10, 2018

(65) Prior Publication Data

US 2018/0198489 A1    Jul. 12, 2018

Related U.S. Application Data

(60) Provisional application No. 62/509,801, filed on May 23, 2017, provisional application No. 62/444,874, filed on Jan. 11, 2017.

(51) Int. Cl.
*H04L 7/00* (2006.01)
*H04B 5/00* (2006.01)
(Continued)

(52) U.S. Cl.
CPC ......... *H04B 5/0068* (2013.01); *H04L 7/0331* (2013.01); *H04L 7/08* (2013.01);
(Continued)

(58) Field of Classification Search
None
See application file for complete search history.

(56) References Cited

U.S. PATENT DOCUMENTS 6,907,088 B1    6/2005  Nakane et al.
7,847,627 B2   12/2010  Kranabenter
(Continued)

FOREIGN PATENT DOCUMENTS

CN    105049069 A    11/2015
TW    2014-24307 A    6/2014
(Continued)

OTHER PUBLICATIONS

Extended Search Report dated Jun. 7, 2018 in connection with European Application No. 18150474.7.
(Continued)

*Primary Examiner* — Adolf Dsouza
(74) *Attorney, Agent, or Firm* — Wolf, Greenfield & Sacks, P.C.

(57) ABSTRACT

Circuits and methods for active load modulation is described. These circuits and methods may be employed in connection with near field communication (NFC) systems, for example in the proximity inductive coupling card (PICC). The methods described herein may be used to synchronize the operations of the system to the carrier clock provided by a reader with typical operation frequency of 13.56 MHz±7 KHz. The synchronization may be performed by locking an internal clock to the carrier clock when the transmission of data is disabled, by locking the internal clock to a local clock when data transmission is enabled, and by compensating the phase or frequency of the active load modulation clock to track the carrier clock.

20 Claims, 5 Drawing Sheets

(51) Int. Cl.
*H04L 7/033* (2006.01)
*H04L 7/08* (2006.01)
*H04L 27/00* (2006.01)
*G06Q 20/32* (2012.01)
*H04L 27/04* (2006.01)
*H04L 27/36* (2006.01)

(52) U.S. Cl.
CPC ..... *H04L 27/0014* (2013.01); *G06Q 20/3278* (2013.01); *H04L 27/04* (2013.01); *H04L 27/36* (2013.01)

(56) References Cited

U.S. PATENT DOCUMENTS

| | | |
|---|---|---|
| 7,885,359 B2 | 2/2011 | Meltzer |
| 7,890,080 B2 | 2/2011 | Wu et al. |
| 7,907,005 B2 | 3/2011 | Kranabenter |
| 8,838,023 B2 | 9/2014 | Charrat et al. |
| 8,934,836 B2 | 1/2015 | Lefley |
| 2008/0252367 A1 | 10/2008 | Pettersen et al. |
| 2011/0064165 A1 | 3/2011 | Bae et al. |
| 2013/0321230 A1 | 12/2013 | Merlin et al. |
| 2016/0142113 A1 | 5/2016 | Gaethke et al. |
| 2016/0241384 A1 | 8/2016 | Frantzeskakis et al. |
| 2018/0006801 A1 | 1/2018 | Hung et al. |
| 2018/0110018 A1* | 4/2018 | Yu .................. H04B 5/0031 |
| 2018/0183637 A1 | 6/2018 | Undheim et al. |
| 2018/0198652 A1 | 7/2018 | Choke et al. |
| 2018/0198653 A1 | 7/2018 | Cao et al. |

FOREIGN PATENT DOCUMENTS

| | | |
|---|---|---|
| TW | 2015-34016 A | 9/2015 |
| WO | WO 2008/093254 A1 | 8/2008 |

OTHER PUBLICATIONS

Choke et al., "A 3.4Mbps NFC Card Emulator Supporting 40mm2 Loop Antenna" 2017 IEEE Radio Frequency Integrated Circuits Symposium (RFIC), Jun. 4, 2017, pp. 244-247.

Bo et al., Low power clock recovery circuit for passive HF RFID tag. Analog Integr Circ Sig Process. 2009;59:207-14.

Lichong et al., High-precision high-sensitivity clock recovery circuit for a mobile payment application. J of Semiconductors. May 2011;32(5):055007-1-6.

Lien et al., A Self-Calibrating NFC SoC with a Triple-Mode Reconfigurable PLL and a Single-Path PICC-PCD Reciever in 0.1 μm CMOS. IEEE International Solid-State Circuits Conference Feb. 11, 2014, Session 9, Digest of Technical Papers. 158-59.

U.S. Appl. No. 15/726,993, filed Oct. 6, 2017, Cao et al.

U.S. Appl. No. 15/820,211, filed Nov. 21, 2017, Choke et al.

* cited by examiner

HIGH-SPEED CIRCUITS FOR ACTIVE LOAD MODULATION AND RELATED METHODS

RELATED APPLICATIONS

This Application claims priority under 35 U.S.C. § 119(e) to U.S. Provisional Application Ser. No. 62/444,874, entitled "3.4 MBPS NFC CARD EMULATOR SUPPORTING 40 $MM^2$ LOOP ANTENNA" filed on Jan. 11, 2017, which is herein incorporated by reference in its entirety and claims priority under 35 U.S.C. § 119(e) to U.S. Provisional Application Ser. No. 62/509,801, entitled "METHOD TO GENERATE ACTIVE LOAD MODULATION IN NEAR FIELD COMMUNICATION DEVICE" filed on May 23, 2017, which is herein incorporated by reference in its entirety.

BACKGROUND

Near field communication (NFC) includes a set of communication protocols allowing communication between electronic devices over short distances, typically within a few centimeters. NFC devices are used in numerous applications, including in contactless payment systems such as credit cards, electronic ticket smartcards and mobile payment systems.

BRIEF SUMMARY

Some embodiments relate to a method comprising receiving a carrier clock from a reader through an antenna, receiving a local clock from a reference oscillator, in a reception (RX) phase, locking an output of a controllable oscillator to the carrier clock, in a transmission (TX) phase: locking the output of the controllable oscillator to the local clock and generating an amplitude load modulation (ALM) clock based on the output of the controllable oscillator, wherein the transmission phase comprises an unloaded phase and a burst phase; and controlling a timing of transmission of data to the reader, wherein controlling the timing of the transmission of data comprises: in the unloaded phase, timing the ALM clock based on the carrier clock, and in the burst phase, timing the transmission of data to the reader based on the ALM clock and transmitting the data to the reader.

Some embodiments relate to an apparatus configured to receive a carrier clock from a complementary apparatus through an antenna and a local clock from a reference oscillator. The apparatus may comprise control circuitry configured to: in a reception (RX) phase, lock an output of a controllable oscillator to the carrier clock, in a transmission (TX) phase: lock the output of the controllable oscillator to the local clock and generate an amplitude load modulation (ALM) clock based on the output of the controllable oscillator, wherein the transmission phase comprises an unloaded phase and a burst phase, in the unloaded phase, time the ALM clock based on the carrier clock, and in the burst phase, time the transmission of data to the reader based on the ALM clock and cause transmission of the data to the reader.

Some embodiments relate to an apparatus comprising a multiplexer having a first input and a second input, the first input being coupled to an antenna through a matching network and the second input being coupled to a reference oscillator, a phase locked loop (PLL) having an input coupled to an output of the multiplexer, and an amplitude load modulation (ALM) clock generator coupled to an output of the PLL and a modulator coupled between the ALM clock generator and the matching network.

The foregoing summary is provided by way of illustration and is not intended to be limiting.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing.

DETAILED DESCRIPTION

Active load modulation is a technique that has been recently developed to boost load modulation amplitude to overcome the fact that, when a small antennas are utilized, inductive coupling is often too weak to support reliable transfer of data. This is the case for example in portable devices using near field communication (NFC) for wireless communications, such as smartphones and wearable devices, in which the available real estate is so limited as to only provide sufficient room for very small antennas. Compact devices with such limited availability of physical area are often used to emulate contactless cards such as those that may be found in credit cards, debit cards, public transportation cards, gift cards, etc.

Contactless cards, on the other hand, have sufficient room to accommodate large antennas and therefore can rely on passive load modulation to convey information stored in the card to a reader. When the card is brought in proximity to the reader, the reader transmits a carrier to the card's transponder via magnetic coupling. Upon receiving the carrier, the transponder extracts energy from the carrier and uses this energy to power its operations. Subsequently, the transponder transmits data back to the reader. The data may include, for example, credit card numbers, personal information, product identifiers, information for granting access to buildings, etc. The data is sent to the reader via load modulation. That is, the transponder modulates, based on the information to be transmitted, the impedance of a load, which is inductively coupled to the reader. The information can be extracted by the reader by detecting the load modulation. Passive load modulation has been very successful, because it enables communication without requiring the use of batteries to power the card's circuitry. In fact, power is conveyed through the reader's carrier (hence the term "passive").

The general expectation among card users is that transactions can be quickly established simply by tapping the reader with the card, often even without having to remove the card from the wallet or handbag in which it is kept. To ensure quick and reliable transactions, engineers have developed architectures in which the reader and the card can be strongly magnetically coupled to each other. To that effect, large antenna are often used. A typical contactless card antenna's surface area is 4000 $mm^2$.

Recent technologies, such as NFC, attempt to emulate the functionalities of these cards using portable devices, such as smartphones, enabling users to replace multiple cards with a single device. In this way, consumers can use a single device to access buildings and board trains and buses, to pay for shopping, and to use coupons. Portable devices, however, have far less space than conventional cards to accommodate these large antennas, due to the presence of hundreds of electronic circuits for supporting all their other functionalities, large batteries, and large displays. Typical antennas for NFC have areas of 40 $mm^2$ or even less. Further, the trend in portable devices is to continuously decrease the device form factor. These limitations pose a considerable challenge to portable devices manufacturers, since portable devices provide space only for small antenna thus seriously hindering the device's ability to establish quick and reliable transactions. To support transactions with small antenna, manufacturers are increasingly relying on active load modulation. With active load modulation, a transponder responds by transmitting an active load modulation signal to the reader. The active load modulation signal is generated by modulating an active load modulation (ALM) carrier timed by an active load modulation (ALM) clock according to the data to be transmitted. The data is encoded by the presence and absence of transmitted ALM carrier.

The inventors have recognized a challenge in the design of active load modulation circuits, which is attributable to the fact that the transmission of data can corrupt the transponder's ability to synchronize the ALM clock to the reader's carrier. In particular, the inventors have appreciated that the transmission of the ALM carrier by a transponder can hinder the transponder's ability to lock to the carrier transmitted by the reader, due to the fact that the resultant active load modulation signal can be significantly larger in power relative to the carrier signal. As a result, the carrier is effectively obscured by the active load modulation signal, thus making it difficult for the phase locked loop (PLL) of the transponder to lock to the carrier. Lack of synchronization between devices communicating via active load modulation may significantly reduce the devices' ability to exchange data accurately.

Some systems using active load modulation achieve synchronization to the reader by periodically switching the PLL between a locked mode and an unlocked mode. During the transmit phase, when the ALM carrier is transmitted to the reader, the PLL is operated in free run. That is, the PLL is not locked to any signal. Vice versa, when the ALM carrier is not transmitted to the reader, the PLL is locked to the carrier signal transmitted by the reader. In this way, there is no overlap in time between the transmission of ALM carrier and the synchronization to the reader's carrier. The major limitation of this approach is that causing the PLL to operate between the locked and the unlocked mode poses a bottleneck in the bit rate at which data can be transmitted. In particular, when the PLL is reactivated upon free running, locking of the PLL to the carrier can take several clock cycles. The larger the number of clock cycles it takes the PLL to lock back to the carrier, the lower the highest bit rate than can be achieved. The bit rate of systems utilizing this approach is typically limited to a few hundred KHz.

Recognizing this limitation, the inventors have developed circuits for active load modulation that can be used to support very high bit rates (VHBR), for example in excess of 1 Mbit/s. Such high bit rates may be achieved, according to some embodiments of the present application, by locking the PLL to the reader's carrier during the reception (RX) phase, when data is transmitted from the reader to the transponder, and by locking the PLL to a reference clock other than the carrier clock during the transmission (TX) phase, when data is transmitted from the transponder back to the reader. As a result the PLL is continuously operated in the locked mode, though the locking is periodically switched between different signals, thus avoiding reactivation of the PLL upon free running. Synchronization of the transponder to the reader during the TX phase may be accomplished by retiming the ALM clock to the reader's carrier when ALM carrier is not transmitted. This phase is referred to as the unloaded phase. For example, a synchronization pulse may be generated and aligned in time to a rising edge (or alternatively to a falling edge) of the carrier signal, and subsequently to time the ALM clock based on the synchronization pulse. When configured in such a manner, synchronization of the ALM clock to the carrier may take as few as a single clock cycle, thus substantially increasing the rate at which the transponder can transmit data.

Being able to support high bit rates, the circuits developed by the inventors have the opportunity to extend active load modulation schemes to applications in which high volumes of data are exchanged between two wirelessly coupled device.

Figure 1:
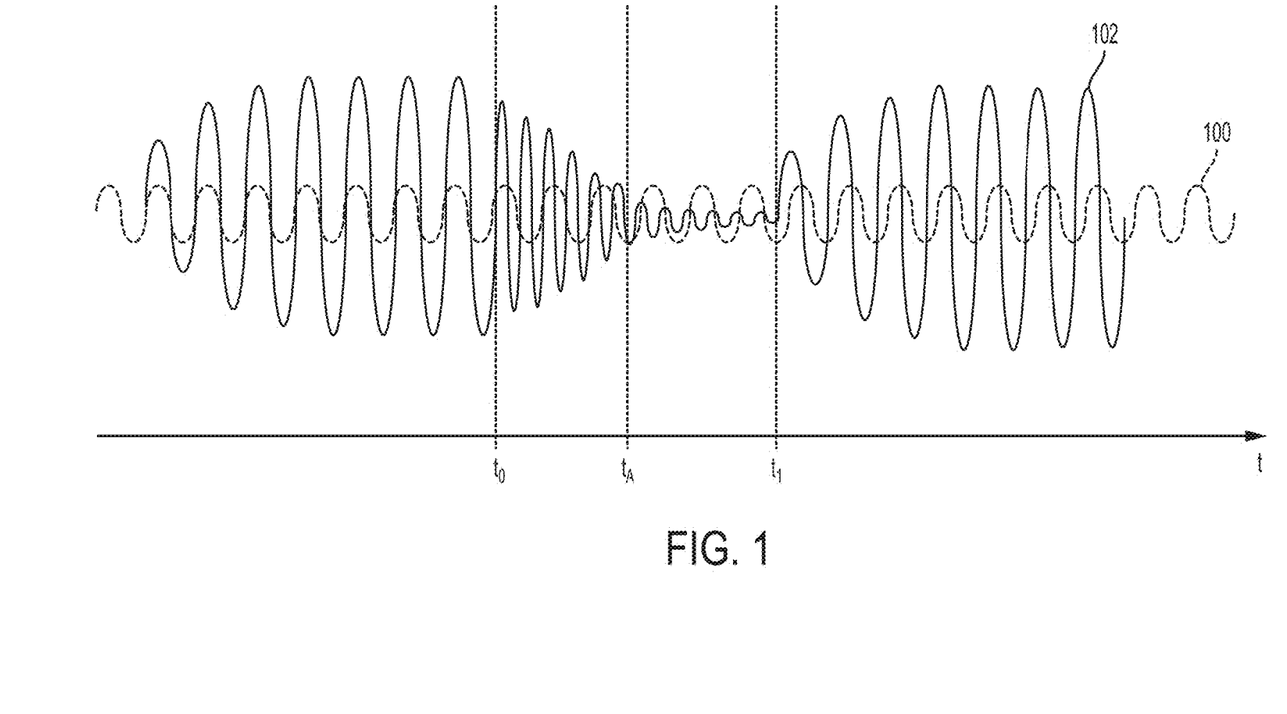
FIG. 1 is a plot illustrating an active load modulation signal and a carrier signal transmitted by a reader observed at the transponder, in accordance with some embodiments.

FIG. 1 depicts two signals that are simultaneously present in a transponder's active load modulation circuitry: the active load modulation signal 102, which is encoded with information to be transmitted to a reader, and the carrier signal 100, which is generated by the reader and received at the transponder. To establish communication between the transponder and the reader, it is important that the transponder's ALM clock be synchronized to the carrier (typically a 13.56 MHz±7 KHz tone, though other frequencies are also possible) provided by the reader. In fact, a load modulation can be detected at the reader by sensing the load modulation amplitude. However, synchronization to carrier signal 100 may be impaired by the fact that the carrier signal 100 is obscured by the active load modulation signal 102, which exhibits a significantly larger power when observed at the transponder. This effect is particularly serious during the burst phases (before time $t_0$ and after time $t_1$), in which the ALM carrier is transmitted to the reader. As a result, the phase of the active load modulation signal 102 may drift relative to that of the carrier signal 100. As further illustrated in FIG. 1, even when the ALM carrier is not transmitted (between $t_0$ and $t_1$), the active load modulation signal 102 may continue to oscillate with a significant amplitude, at least until time $t_4$. As a result, the carrier signal 100 continues to be obscured even outside the burst phases. This extended oscillation may be caused by ringing in the matching network, whereby the matching network continues to oscillate at its resonant frequency even after transmission of the ALM carrier has stopped. Time $t_4$ may be viewed as the time when the ringing effect has substantially decayed (e.g., the ringing oscillation has decayed to ½ of the amplitude at its maximum, to ⅕ of the amplitude at its maximum, to ​1⁄10 of the amplitude at its maximum, or to any other suitable value).

Maximum load modulation amplitude may be established by causing the difference between the carrier's phase of the reader and the phase of the inductively coupled ALM carrier to be 0° or 180°, depending on the bit being transmitted. However, if the phase difference drifts and such a drift is greater than 30°, the reader's ability to discern load modulation amplitude may be too weak to support NFC communications.

In some embodiments, active load modulation synchronization can be established by 1) allowing the circuit to synchronize to the reader's carrier clock received during an unloaded state when the ALM carrier is not transmitted (e.g., the phase between $t_0$ and $t_1$ in FIG. 1), and 2) retiming an edge of the ALM clock based on the reader's carrier clock during the unloaded phase. Subsequently, during a burst phase, the ALM carrier may be transmitted to the reader and the transmission may be timed based on the ALM clock.

Figure 2:
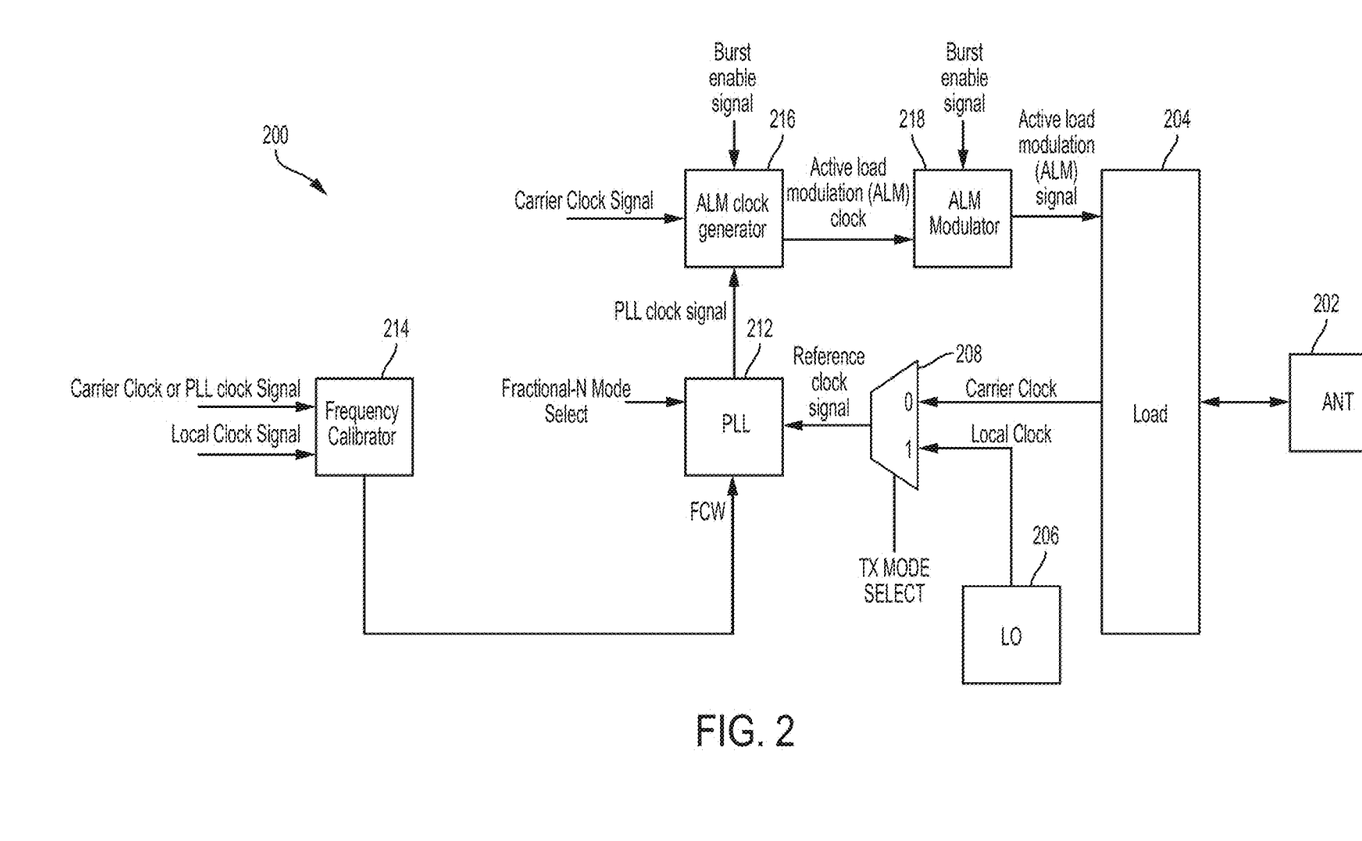
FIG. 2 is a block diagram illustrating an example of a system for active load modulation, in accordance with some embodiments.

FIG. 2 is a block diagram illustrating a system for active load modulation, in accordance with some embodiments. System 200 may be implemented on a transponder, such as a card or a device configured to emulate a card, or any other suitable type of electronic device. System 200 communicates with a corresponding device via magnetic coupling. As such, system 200 includes an antenna 202, which may be implemented as an inductor (e.g., one or more windings or a trace on a printed circuit board having one or more turns). Antenna 202 may be used to receive carrier signals provided by a corresponding device and to transmit an active load modulation signal back to such a device.

It should be appreciated that while FIG. 2 illustrates a system having a single antenna, multiple antennas may be used in other embodiments. For example, one antenna may be used in transmission and one antenna may be used in reception. Additionally or alternatively, multiple antennas may be used to support transactions between system 200 and multiple other devices.

In some embodiments, communication between system 200 and other devices may be performed using NFC protocols. In these embodiments, system 200 may serve as the proximity inductive coupling card (PICC) and the device to which system 200 is magnetically coupled as the proximity coupling device (PCD) or reader. Additionally, the opposite arrangement is also possible in some embodiments. In yet other embodiments, peer-to-peer transactions may be established whereby system 200 communicates via antenna 202 to an analogous device. This may be the case, for example, when two smartphones exchange data via NFC. Coupled to antenna 202 may be load 204, which may include a matching network for providing a desired resonant frequency.

System 200 may further comprise reference oscillator 206, multiplexer (mux) 208, PLL 212, frequency calibrator 214, active load modulation (ALM) clock generator 216 and ALM modulator 218. Reference oscillator 206 may be configured to output a local clock signal. In some embodiments, the local clock signal has a frequency that is 13.56 MHz±7 KHz, though of course other frequencies are also possible. Mux 208 may receive as inputs the carrier clock signal (received by system 200 via antenna 202) and the local clock signal (generated by reference oscillator 206). The carrier clock may be extracted from the received carrier signal using a clock extractor and a clock squarer (not shown in FIG. 2). The output of mux 208 is controlled through signal TX MODE SELECT. During the RX phase (TX MODE SELECT=0), when data is transmitted from the reader to system 200, the carrier clock is selected as the reference clock signal. During the TX phase (TX MODE SELECT=1), when data is transmitted from system 200 to the reader, the local clock is selected as the reference clock signal.

ALM modulator 218 may comprise a power amplifier with programmable output power. The ALM modulator 218 may be used to transmit data (labelled "active load modulation signal" in FIG. 2) to the reader. Transfer of data may be accomplished using different modulation schemes, such as amplitude shift keying (ASK). The modulation may be performed using a 848 Kbps subcarrier. Reception of the data at the reader may be achieved by detecting the load modulation amplitude resulting from the superposition of the reader's carrier with the active load modulation signal received at the reader's antenna, where the load modulation is caused by the active load modulation signal. System 200 may be arranged to operate in half-duplex mode. Accordingly, in the RX phase, system 200 may emulate a PICC and may receive data transmitted from a reader. Reception of the reader's data may be accomplished by demodulating the modulated carrier transmitted by the reader. In the TX phase, system 200 may emulate a PICC in transmission, and may transmit data to the reader by sending the active load modulation signal back to the reader.

Timing of the operations of the ALM modulator 218 may be controlled by ALM clock generator 216 via the ALM clock. Frequency calibrator 214 may be used to limit drifting of the ALM clock relative to the carrier clock, as explained further below. Frequency calibrator 214 may control the operations of the PLL via signal Frequency Control Word (FCW).

Figure 3A:
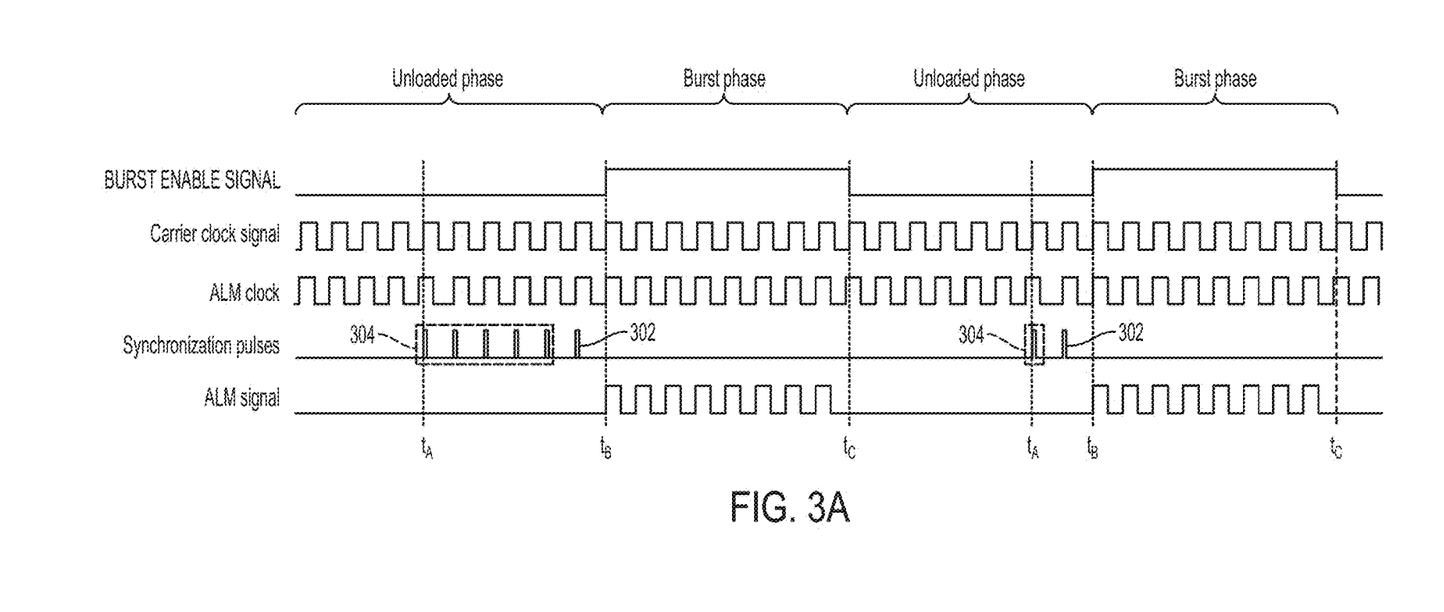
FIG. 3A is a plot illustrating representative operations of the system of FIG. 2 in accordance with some embodiments.

FIG. 3A is a plot illustrating an example of how system 200 may be operated in the TX phase, in accordance with some embodiments. In this case, the system 200 alternates between the unloaded phase and the burst phase depending on the state of the BURST ENABLE SIGNAL. As shown in FIG. 2, the BURST ENABLE SIGNAL may control the operations of ALM clock generator 216 and ALM modulator 218. Further shown in FIG. 3A are the carrier clock signal received through antenna 202, the ALM clock as provided by ALM clock generator 216, a set of synchronization pulses and the active load modulation signal.

PLL 212 may lock its internal frequency to the frequency of the signal received through mux 208. In the RX phase, the carrier clock signal is selected. In the TX phase, the local clock is selected. The PLL can operate in integer-N mode and fractional-N mode. In the RX phase, the PLL may operate in integer-N mode. In the TX phase, the PLL may operate in integer-N or fractional-N mode, depending on the signal FRACTIONAL-N MODE SELECT, as will be described further below.

Synchronization of the ALM clock may be accomplished, at least in some embodiments, by generating synchronization pulses 302 in the unloaded phase. In some embodiments, a synchronization pulse 302 may be generated at or after time $t_A$, when the ringing of the matching network has decayed significantly (as described in connection with FIG. 1). Synchronization pulse 302 may be aligned in time to an edge of the carrier clock, such as a rising edge as illustrated in FIG. 3A. In some embodiments, synchronization pulse 302 is generated at time $t_A$. In other embodiments, synchronization pulse 302 may be generated after time $t_A$ (as illustrated in FIG. 3A). In some such embodiments, synchronization pulse 302 may be preceded by one or more additional pulses 304.

Subsequently, still during the unloaded phase, the ALM clock may be retimed based on the synchronization pulse 302, and optionally based on additional pulse(s) 304. For example, an edge of the ALM clock signal (such as a rising edge) may be retimed based on (e.g., aligned to) synchronization pulse 302. When no additional pulses are generated, synchronization of the ALM clock signal may be achieved in a single clock cycle (e.g., the cycle after $t_A$). When additional pulses are used, multiple edges of the ALM clock signal may be aligned to the additional pulses. In this case, more than one clock cycle is used for the synchronization. The minimum duration of the unloaded phase may be determined by the bit rate and the signaling mode. The more clock cycles are needed for synchronization, the longer the required minimum duration of the unloaded phase. The required minimum duration of the unloaded phase limits the highest bit-rate for a given signaling mode. Reducing the number of clock cycles required for synchronization increases the highest bit rate that can be transmitted with system 200.

Figure 3B:
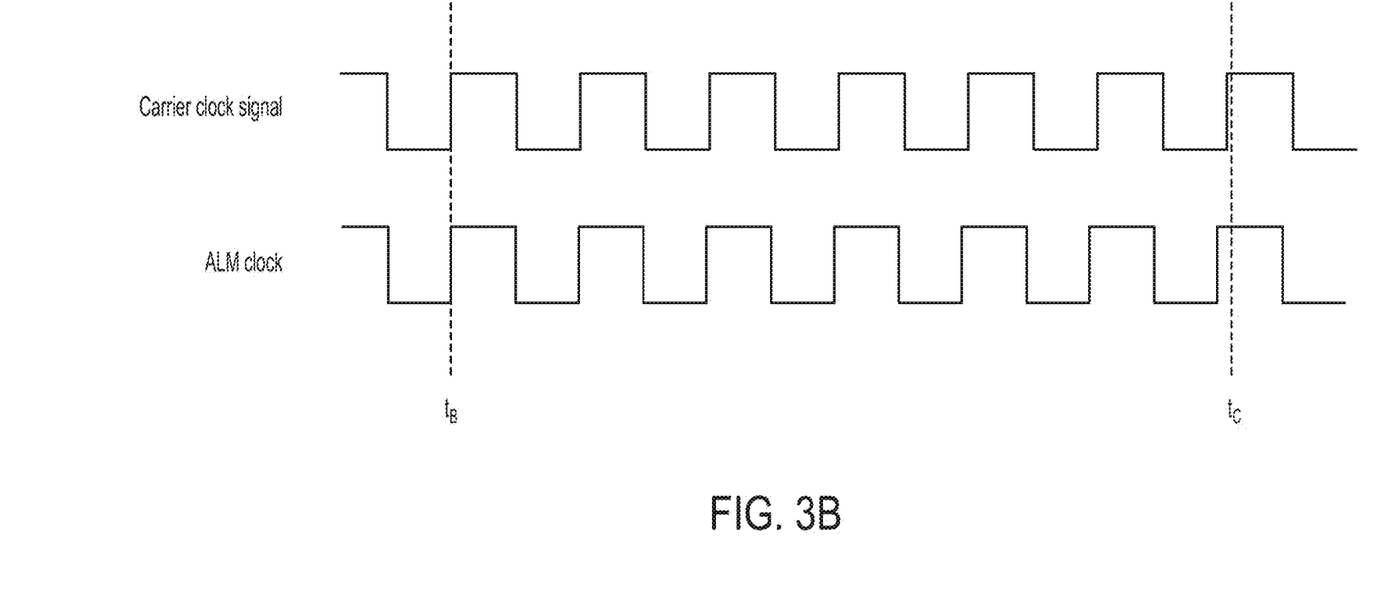
FIG. 3B is a plot illustrating a carrier clock signal and an active load modulation signal during a burst phase, in accordance with some embodiments.

Transmission of the active load modulation signal may be timed by the ALM clock signal in the burst phase. Outside the burst phase, the ALM carrier is not transmitted. In some embodiments, as further illustrated in FIG. 3B, the phase of the ALM clock may drift relative to that of the carrier clock, for example due to the fact that the carrier clock and the ALM clock exhibits slightly different frequencies. This drift, however, may be limited to less than 30°, at least in some embodiments, as described further below.

Figure 4:
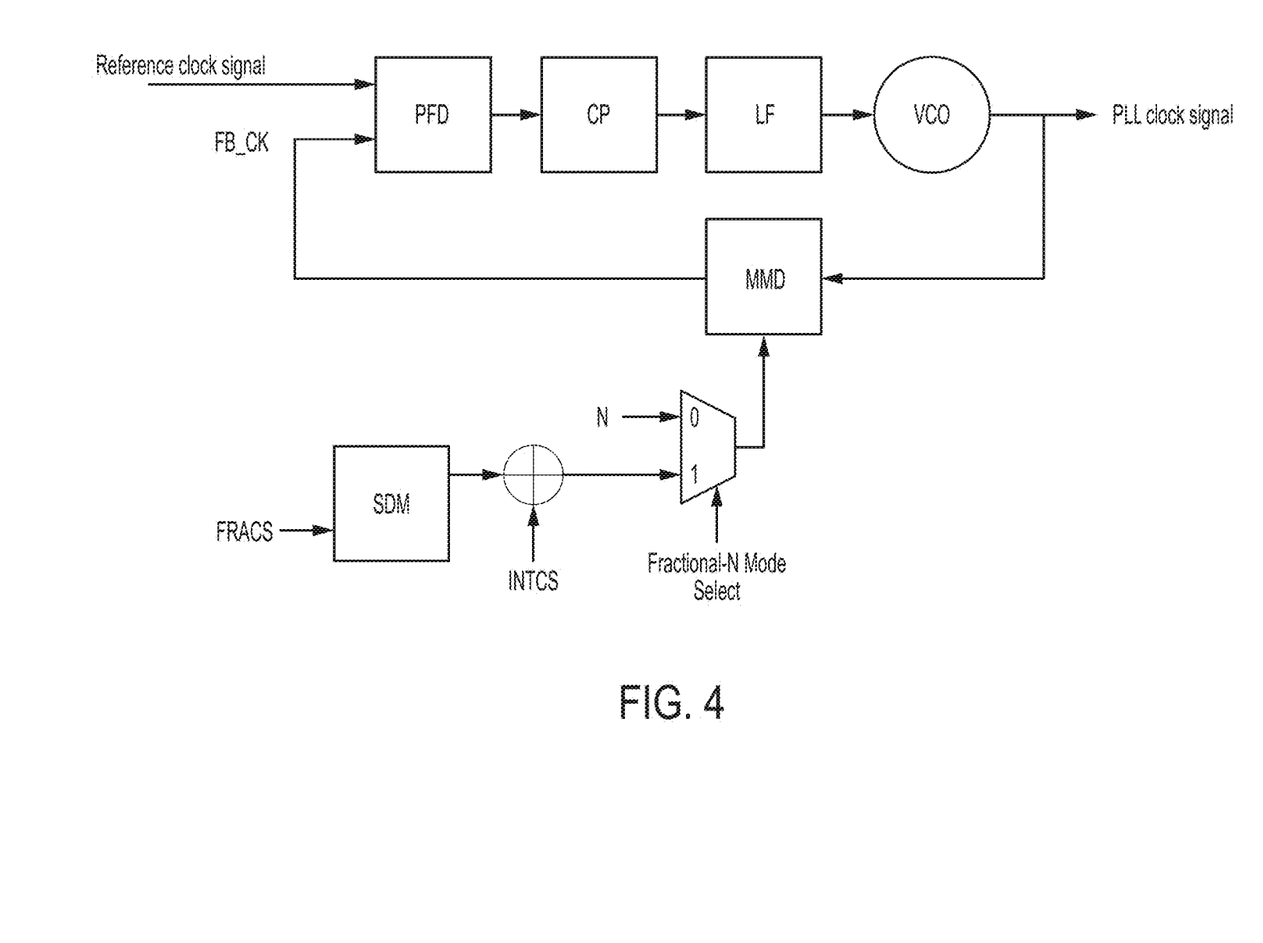
FIG. 4 is a block illustrating a phase locked loop that may be used in the system of FIG. 2, in accordance with some embodiments.

One possible implementation for PLL 212 is illustrated in FIG. 4, in accordance with some embodiments. In this case, PLL 212 includes a phase comparator (PFD), a charge pump (CP), a loop filter (LF, which may be a low-pass filter), a voltage controlled oscillator (VCO), a sigma-delta modulator (SDM), a multi-modulus divider (MMD), and a multiplexer.

In order to limit the drift of the ALM clock to less than 30°, the typical maximum drift that NFC systems are designed to tolerate, frequency calibrator 214 may be used. The amount of the phase drift may be proportional to the frequency error between the ALM clock and the carrier clock and to the duration of the burst phase. To limit the phase drift due to frequency difference, the frequency of the PLL clock signal and hence the frequency of the ALM clock may be adjusted through the signal Frequency Control Word (FCW), which is generated by the frequency calibrator 214. As the FCW affects the PLL clock signal frequency only while the PLL 212 is in fractional-N PLL mode, PLL 212 may be set to the fractional-N PLL mode for the duration of the TX phase when adjustments of the frequency of the ALM clock signal are appropriate.

The signal FCW may include integer numbers INTCS and FRACS (shown in FIG. 4). The PLL can operate in integer-N and fractional-N PLL mode. In integer-N PLL mode (the multiplexer being set to 0), the MMD (serving as a programmable divider) divider ratio is fixed to N. The VCO clock frequency in integer-N PLL mode for this PLL configuration may be given by FVCO=FREF*N, where FREF is the frequency of the reference clock signal. In fractional-N PLL mode, the MMD divider ratio may be given by the sum of INTCS and the SDM output. In one example, the SDM output may be set to change dynamically between two or more integer values (for example, between 0 and 1) such that the average SDM output may be FRACS/$2^m$ where m is the bit-width of the SDM input. The VCO clock frequency in fractional-N PLL mode may be given by FVCO=FREF* (INTCS+FRACS/$2^m$). It should be noted that, in these examples, when set to the integer-N PLL mode the PLL exhibits a frequency resolution of FREF. On the other hand, when set to the fractional-N PLL mode, the PLL exhibits a frequency resolution of FREF*FRACS/$2^m$. Dividing the frequency resolution in this manner may aid in controlling the phase drift of the ALM clock during the burst phase. In fact, the improved resolution may allow for fine adjustments of the frequency or phase of the ALM clock.

The frequency calibrator 214 may measure the carrier clock frequency or PLL clock signal frequency (locked to the reader's carrier clock signal) while system 200 is in the RX phase and may compute the FCW based on the measured frequency to reduce the frequency difference between the ALM clock and carrier clock. The frequency 214 calibrator may comprise a frequency counter, which may count the rising or falling edges of the carrier clock signal or PLL clock signal for a fixed duration of time (e.g., for a duration that is equivalent to K local clock cycles, where K is a constant).

Adjusting the frequency of the ALM in this manner in the fractional mode may ensure that the phase drift of the ALM clock relative to the carrier clock is less than 30°.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including", "comprising", "having", "containing" or "involving" and variations thereof herein, is meant to encompass the items listed thereafter and equivalents thereof as well as additional items.

The use of "coupled" or "connected" is meant to refer to circuit elements, or signals, that are either directly linked to one another or through intermediate components.

What is claimed is:

1. A method comprising:
   receiving a carrier clock from a reader through an antenna;
   receiving a local clock from a reference oscillator;
   in a reception (RX) phase, locking an output of a controllable oscillator to the carrier clock;
   in a transmission (TX) phase:
      locking the output of the controllable oscillator to the local clock and generating an amplitude load modulation (ALM) clock based on the output of the controllable oscillator, wherein the transmission phase comprises an unloaded phase and a burst phase; and
      controlling a timing of transmission of data to the reader, wherein controlling the timing of the transmission of data comprises:
         in the unloaded phase, timing the ALM clock based on the carrier clock; and
         in the burst phase, timing the transmission of data to the reader based on the ALM clock and transmitting the data to the reader.

2. The method of claim 1, wherein timing the ALM clock based on the carrier clock comprises:
   generating one or more synchronization pulses, and aligning one or more edges of the ALM clock to respective synchronization pulses of the one or more synchronization pulses.

3. The method of claim 2, wherein generating the one or more synchronization pulses comprises generating a single synchronization pulse.

4. The method of claim 2, wherein generating one or more synchronization pulses comprises generating one or more synchronization pulses in correspondence with respective one or more edges of the carrier clock.

5. The method of claim 1, further comprising disabling the transmission of the active load modulation (ALM) carrier in the unloaded phase.

6. The method of claim 1, further comprising:
limiting a phase drift of the ALM clock relative to the carrier clock, wherein limiting a phase drift of the ALM clock relative to the carrier clock comprises calibrating a frequency of the output of the controllable oscillator based on the carrier clock.

7. The method of claim 6, wherein calibrating a frequency of the output of the controllable oscillator based on the carrier clock comprises setting a phase locked loop comprising the controllable oscillator in a fractional mode.

8. The method of claim 1, wherein the data is a first data, and wherein the method further comprises:
in the RX phase, receiving second data transmitted from the reader.

9. The method of claim 1, wherein transmitting the data to the reader comprises modulating the ALM clock with an amplitude shift keying (ASK) modulation scheme.

10. The method of claim 1, wherein transmitting the data to the reader comprises modulating the ALM clock with a 848 Kbps subcarrier.

11. The method of claim 1, wherein receiving a carrier clock from a reader through an antenna comprises receiving the carrier clock inductively.

12. An apparatus configured to receive a carrier clock from a complementary apparatus through an antenna and a local clock from a reference oscillator, the apparatus comprising:
control circuitry configured to:
in a reception (RX) phase, lock an output of a controllable oscillator to the carrier clock;
in a transmission (TX) phase:
lock the output of the controllable oscillator to the local clock and generate an amplitude load modulation (ALM) clock based on the output of the controllable oscillator, wherein the transmission phase comprises an unloaded phase and a burst phase;
in the unloaded phase, time the ALM clock based on the carrier clock; and
in the burst phase, time the transmission of data to the reader based on the ALM clock and cause transmission of the data to the reader.

13. The apparatus of claim 12, wherein the control circuitry is configured to time the ALM clock based on the carrier clock at least in part by:
generating one or more synchronization pulses, and aligning one or more edges of the ALM clock to respective synchronization pulses of the one or more synchronization pulses.

14. The apparatus of claim 13, wherein the control circuitry is configured to generate the one or more synchronization pulses by generating a single synchronization pulse.

15. The apparatus of claim 13, wherein the control circuitry is configured to generate one or more synchronization pulses by generating one or more synchronization pulses in correspondence with respective one or more edges of the carrier clock.

16. The apparatus of claim 12, wherein the control circuitry is further configured to disable the transmission of the active load modulation (ALM) carrier in the unloaded phase.

17. The apparatus of claim 12, wherein the control circuitry is further configured to:
limit a phase drift of the ALM clock relative to the carrier clock by calibrating a frequency of the output of the controllable oscillator based on the carrier clock.

18. An apparatus comprising:
a multiplexer having a first input and a second input, the first input being coupled to an antenna through a matching network and the second input being coupled to a reference oscillator;
a phase locked loop (PLL) having an input coupled to an output of the multiplexer;
an amplitude load modulation (ALM) clock generator coupled to an output of the PLL and a modulator coupled between the ALM clock generator and the matching network; and
a frequency calibrator coupled to a control input of the PLL, wherein the frequency calibrator is configured to control a frequency output by the PLL.

19. The apparatus of claim 18, wherein the frequency calibrator comprises a frequency measuring unit.

20. The apparatus of claim 18, wherein the reference oscillator is configured to provide, to the second input of the multiplexer, a clock signal having a frequency that is 13.56 MHz±7 KHz.

* * * * *